United States Patent [19]

Hung et al.

[11] 4,139,302

[45] Feb. 13, 1979

[54] METHOD AND APPARATUS FOR INTERFEROMETRIC DEFORMATION ANALYSIS

[75] Inventors: Yau Y. Hung; Ralph M. Grant, both of Rochester, Mich.

[73] Assignee: Dr. Ralph M. Grant Engineering Consultants, Inc., Auburn Heights, Mich.

[21] Appl. No.: 769,422

[22] Filed: Feb. 17, 1977

[51] Int. Cl.² .................. G01B 11/16; G01B 9/02; G01B 11/00

[52] U.S. Cl. .................................. 356/32; 73/800; 73/655; 350/204; 356/358; 356/390

[58] Field of Search ............. 356/32, 109, 162, 163; 73/88 A, 655 (U.S. only), 71.3; 350/204

[56] References Cited

U.S. PATENT DOCUMENTS 3,767,308  10/1973  Duffy ..................................... 356/32

OTHER PUBLICATIONS

Meas . . . . by "Speckle-Shearing Interferometry"; Hung et al.; Experimental Mechanics, vol. 14 No. 7; Jul. 74; pp. 281-285.
Speckle-Shearing Interferometric Technique: . . . . ;
Hung et al.; Applied Optics; vol. 14 No. 3; pp. 618-622; Mar. 75.

*Primary Examiner*—Vincent P. McGraw
*Attorney, Agent, or Firm*—Krass & Young

[57] ABSTRACT

To obtain a photographic record of an object surface having superimposed interference fringes arrayed as a function of the deformation which results in the object from an applied stress, which may be mechanical, thermal, or the like, the object is first illuminated with coherent light. The illuminated surface is then photographed with a camera having an optical wedge disposed over half of its lens to record two slightly displaced overlapping images of the object on the camera film. The object is then stressed by changing the ambient temperature or pressure or other mechanical loading, and the undeveloped film is exposed to a second set of overlapping images. The developed photograph contains a set of equal amplitude fringes representing the interference pattern between the two fringe sets generated by the two exposures and arrayed as a function of the strain in the object as a result of the stress. To render the fringe set visible, an image of the object is projected on a screen through a Fourier, fringe-frequency sensitive filter which enhances the fringe contrast on the resulting image of the object.

17 Claims, 5 Drawing Figures

METHOD AND APPARATUS FOR INTERFEROMETRIC DEFORMATION ANALYSIS

BACKGROUND OF THE INVENTION

1. Field of the Invention

This invention relates to a method and apparatus for mapping the deformation which occurs on a surface of an object as a result of stressing the object and more particularly to such a method employing the coherent photographic techniques.

2. Prior Art

A knowledge of the deformation patterns which occur in an object when the object is subjected to a stress is useful in areas such as stress analysis, vibration studies, inspection of hidden flaws in structures, material properties evaluation, velocity measurement, thermal measurement, and optical component testing. As employed hereinafter, the term "deformation" refers to the relative displacement of points on the object's surface relative to one another resulting from the imposed stress, as opposed to overall, uniform displacements resulting from the stress.

The simplest and oldest method of determining such surface deformation involved the point-by-point mapping of the object surface before and after imposition of the stress employing any of a variety of measurement techniques ranging from contact surface gaging, through strain gages, to the highly precise optical interference techniques. These methods are inherently extremely slow or yield information relating to relatively few points on the object surface and are generally unsuitable for any form of testing that must be regularly repeated, such as for production inspection use.

The invention of practical holography techniques during the 1960's led to the development of holographic interferometric techniques for mapping the displacement of an entire object surface resulting from an applied stress. The object was illuminated with coherent light and a photographic media was exposed to the interference pattern between unimaged light reflected from the object and a reference beam of coherent light from the illuminating source. In the real time version of the process the photographic media was then developed to form a hologram and the object was then stressed and coherently illuminated and the coherent reconstruction, from the hologram, of the image of the object before testing was superimposed on the object itself. Interference between light reflected from the object in real time and the reconstructed image resulted in an array of interference fringes on the object displaced as a function of the deformation of the object as a result of stressing. In the double exposure version of the technique the media was subjected to two exposures made before and after stressing of the object, and when an image of the object was reconstructed from the resulting hologram using coherent light an array of interference fringes resulting from interference between the two exposures and arrayed as a function of the deformation of the object between the two exposures was visible on the object's surface.

These displacement mapping techniques are disclosed in Grant et al U.S. Pat. No. 3,545,259. They enjoyed a certain degree of commercial success in analyzing subsurface flaws and like imperfections in manufactured objects but its application was limited because of the relatively severe limitations of holography. In the practice of holography the model and the optical apparatus must be aligned with a high degree of precision and the set-up must be highly stabilized and isolated from any possible vibration employing heavy damped tables and the like. The size of an object that can be analyzed is severely limited by the coherence length of the laser and extremely high resolution and low speed photographic medias had to be employed. The process had to be performed in the absence of any ambient light other than that provided by the laser and the light was restricted to a single frequency.

These holographic interferometric techniques do not measure the displacement of points on the object surface relative to one another as a result of the applied stress but rather measure the overall translation displacements due to deformation and rigid body motion. Great difficulty is encountered in distinguishing the interference fringes attributable to various imperfections or non-uniformities in the object from those resulting from overall deflection of the object as a result of stressing. For example, if a rubber tire to be analyzed for subsurface non-uniformities were stressed by modifying the ambient pressure on the tire, the surface under examination would undergo an overall deformation and the surface area immediately over the flaw might undergo a greater deformation. In the reconstruction of the image of the object from the resulting double exposure hologram it would be difficult to separate the fringe families resulting from the anomalous deformation from those resulting from the uniform deformation. While efforts were made to modify the optical set-up between exposures to minimize the fringes resulting from overall deformation, for example see Kersch et al U.S. Pat. No. 3,860,346, this problem was never fully resolved and greatly limited the application of the holographic interferometric technique.

The present invention is broadly directed toward an interferometric technique for producing the same broad type of analysis as double exposure holographic interferometry without the limitations of that prior art technique with respect to the accuracy of set-up, support and the like, and moreover to such a method which eliminates the problem of the fringes representative of anomalous distortion being masked by fringes resulting from a uniform deformation of the object as a result of stress. The method of the present invention also obviates the need for the use of a coherent light source to view the resulting interference fringes.

SUMMARY OF THE INVENTION

The present invention broadly involves the formation of a photographic double exposure interferogram of a coherently illuminated object surface, with the exposures being taken before and after stress is applied to the object. Each exposure of the interferogram represents an interferogram itself, produced by focusing a pair of images of the coherently illuminated object surface on a photographic medium with a slight displacement of one image relative to the other, so that the images overlap through the major portion of their areas, but are not coincident. This will result in a slightly blurred image being recorded on the photographic medium with a superimposed interference pattern. The two exposures are made coincident with one another so that if the object were not stressed between the two exposures, the two identical interferograms would appear as one developed medium. The two interference patterns recorded on the photographic media during the double exposure, one before and one after stressing the object, will themselves interfere to form an interference pattern. This interference pattern, along with a slightly blurred but clearly recognizable image of the object appears on the developed photographic media.

To better understand the mechanism of the invention consider the case in which the stress imposed on the object between the two exposures produces a slight uniform translation of the object laterally to the central axis of the optics. The resulting interference pattern between the first and second interference patterns would be uniform over the entire object area, in the manner of the uniform pattern produced by the superimposition of two identical grids relative to one another. In the practical case, the stress imposed on the object does not produce a totally uniform strain in the object because of the object's structural design and/or various imperfections in the object. Accordingly, the interference patterns recorded during the two exposures are not identical and the final interference pattern recorded on the film, representing the interference between the two separate interference patterns, is non-uniform; the frequency of the interference lines varies over the object surface. The interference frequency at any point on the object's surface is a measure of the deformation of the object's surface.

The fringes produced in this final interferogram are of essentially constant amplitude and constant duty cycle and are typically quite fine so that while an image of the object is visible in this developed interferogram, the average density of the fine interference pattern is uniform over the object's surface and is accordingly difficult to analyze, even if it contains relatively large variations in fringe frequency produced by differing displacements in the object's surface caused by the applied stress.

While it would be possible to measure the fine fringe frequency at any point on the developed picture with the superimposed interferogram employing instruments such as a microscope, in accordance with a preferred embodiment of the present invention these fringes are rendered visible to the naked eye by processing the developed image-interferogram which results from the double exposure process through a fringe-frequency discriminatory filter. This filter preferably takes the form of a Fourier plane filter with a stop for a selected fringe frequency band.

In the preferred embodiment of the invention the photographic media is developed as a transparency, or a transparency is produced from a positive print. This transparency is illuminated by a light beam developed from a point source and the beam is focused. The source need not be coherent. A stop is supported on the opposite side of the transparency from the illumination source at the Fourier plane; i.e., the image plane of the point source. The stop may be central to the optical axis, to block low frequency fringes, or it may be annular in shape to block high frequency fringes. The use of the low frequency block is preferred as it has less deleterious effect on the resulting image of the object. An objective lens focuses an image of the filtered interferogram on a screen to allow for visual viewing of the final result. Alternatively a photographic record may be made of the filtered image. In this final image various fringe arrays are clearly visible. The arrays are centered about points of maximum non-uniform strain of the object as a result of the applied stress.

On the final image there are no visible fringes which result from uniform deformation of the object since the fringes resulting from overall deformation are of constant frequency and are either all passed or all blocked by the Fourier filtering process, and accordingly result in a uniform optical density of the final image; only the fringes representative of anomalous movement of the section are visible.

This anomalous deformation may have resulted from the design of the object or from anomalous structural characteristics of the object, such as cracks, subsurface separations, voids or inclusions or areas of non-uniform strength which affect the surface deformation. The present invention is accordingly useful as a design aid or for the testing of prototype or production parts.

The present invention may be employed in all the applications that have been suggested for holographic interferometry including the detection of cracks in welds, of subsurface voids, separations and nonuniformities in vehicle tires, separations in sandwich honeycombs and other fabricated structures, etc. The present method is much simpler in practice than holographic interferometry because of the relaxation of the positioning requirement, the need for coherent light viewing and the need for complicated vibration isolation. The results obtained from the method are superior because of the high visibility of the fringes that map areas of anomalous deformation and the absence of interfering fringes resulting from uniform deformation.

In a preferred embodiment of the invention the interferograms are formed using a camera which is conventional in construction except for the formation of its lens. The lens is divided into two segments which focus two separate images of the object's surface on the photographic media. On segment may be conventional and the other may have a prism-like wedge formation to shift the focused image that it produces laterally into substantial superposition with the image formed with the regular segment. The camera may be used in a conventional manner and conventional accuracy restrictions are imposed on its operation. Any overall motion of the object between the formation of the two images, within relatively wide limits, results in a uniform interference pattern on the developed photograph-interferogram and does not interfere with the practice of the present invention.

The invention can also be used to map the slopes of the deformation that a vibrating object undergoes. In this embodiment of the invention an object undergoing steady state vibration is imaged by the special camera of the invention through an exposure time of several vibration periods. The film records the time-integrated interference pattern between the two predominant time average positions of the object during the vibration. This image can be processed in the same manner as a double exposure image obtained with the other embodiments of the invention to generate a visible interference pattern arrayed as the slopes of the vibrational amplitude.

The fringe families representative of anomalous deformation patterns which are obtained through use of the present invention are easier to interpret than the interferograms obtained from the practice of holographic interferometry because of the sharpness of the fringes and the absence of any fringes representative of uniform object motion. Other objectives, advantages and applications of the present invention will be made apparent by the following detailed description of the preferred embodiment of the invention. The description makes reference to the accompanying drawings, in which.

Figure 1:
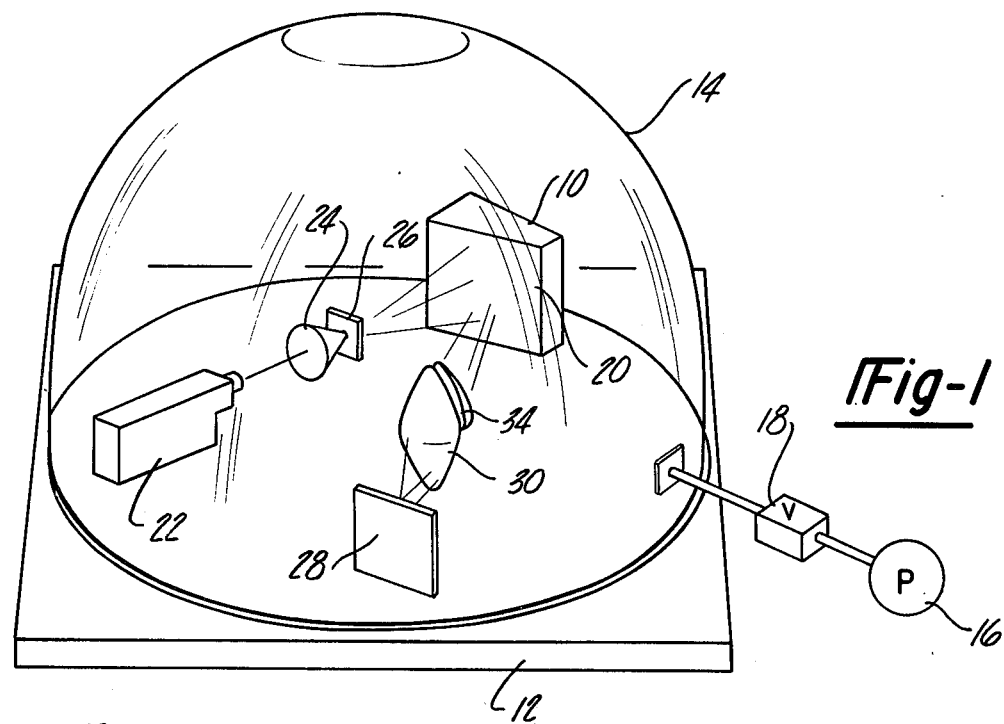
FIG. 1 is a perspective view of an apparatus for forming a double exposure interferogram of a coherently illuminated object surface at two values of ambient pressure on the object.

The apparatus illustrated in FIG. 1 is adapted to analyze the strain pattern occurring on the surface of some object 10 under study as a result of a stress imposed on the object by way of altering the ambient pressure on the object. This pressure change is achieved by supporting the object on a table 12 within a domed pressure cover 14. An air pump 16, connected to the atmosphere at one end, communicates to the volume between the cover 14 and the table 12 through a valve 18. By control of the pump 16 and the valve 18 the pressure within the domed cover 14 may be controlled; it may be made equal to, greater or less than the atmospheric pressure. Using the apparatus of FIG. 1, one exposure of the double exposure process may be made at first pressure and then the pressure may be altered to a second level after which a second exposure is made, so that the strain on the surface of the object resulting from this pressure change may be analyzed.

In an alternative embodiment of the invention the stress may be imposed upon an object under study in other ways such as changing the temperature of the object, changing the mechanical loading of the object, etc. The present invention is in no way limited by these stressing methods.

In FIG. 1 the object 10 is illustrated as a tapered block. The block may be, by way of example, a rubber molding that is to be tested for inclusions adjacent to the surface 20 to be examined.

The section of the surface 20 to be studied is illuminated with coherent light derived from a laser 22. The laser beam is passed through a diverging lens 24 and a pinhole filter 26. Alternatively, the beam could be expanded with a ground glass diffuser or the like. This illuminating apparatus is disclosed as being contained within the pressurized domed cover 14 but in alternative embodiments could be supported externally with the illuminating beam entering into the cover through an appropriate window (not shown).

Coherent light reflected from the surface 20 of the block is focused onto a photographic plate 28 by a special lens 30 which will be termed a shearing lens and will subsequently be disclosed in detail. The lens 30 and photographic plate 28 could be supported within a camera, externally of the domed cover 14. A window would then be provided through the cover 14 for the passage of light reflected from the surface to the camera.

Figure 2:
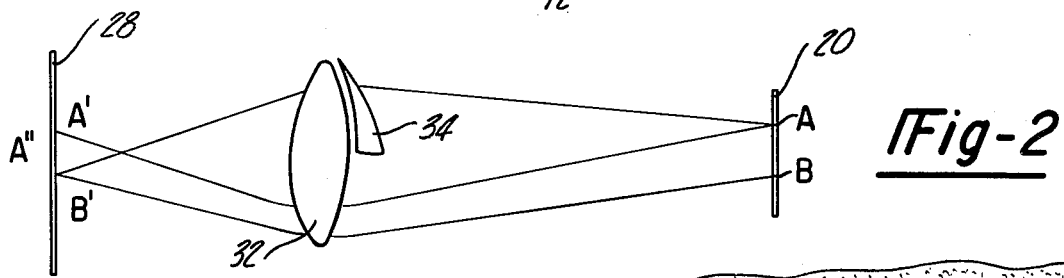
FIG. 2 is a schematic diagram of the apparatus for forming the interferogram.

The optical nature of the shearing lens 30 is disclosed in the schematic diagram of FIG. 2. The lens consists of two parts. One part 32 constitutes a conventional double convex camera lens. A wedge 34 of optical glass covers one half of the lens. The uncovered half of the lens acts to focus light from the illuminated surface 20 onto the photographic plate 28 in a conventional manner. For example, light from a point A on the surface 20 is focused on a point A' on the photographic media 28 and light from a point B from the object surface 20 is focused at a point B'.

Light passing through the wedge 34 from the object 20 is also focused on the photographic plate 28 by the lens 30 to form an image of the surface 20 on the plate, but the image produced is shifted slightly with respect to the image produced by light passing through the uncovered lens section. For example, light reflected from the point A on the object is focused at point A" on the photographic surface 28. It is thus not coincident with light from point A passing through the lens section 32, but rather reaches the point B'.

Thus through use of the shearing lens 30, 34, light from points A and B on the object interfere with one another at the point A"- B'. Likewise, the two images focused on the photographic media 28 by the covered and uncovered lens sections interfere with one another in their overlapping regions. The shift produced by the wedge section 34 is preferably relatively slight compared to the overall dimension of the focused image.

Therefore, if the photographic plate were to be developed a slightly blurred image of the object would be visible, much like an image that is observed when an object photographed with a conventional camera moves during the exposure. The blurred image would have an interference pattern superimposed on its surface resulting from a coherent interference from the two sheared images of the object. This interference pattern would be uniform both in frequency and in amplitude. Other optical elements capable of producing the shearing overlapping images could be employed as alternatives to the lens 30, 34.

Following the recording of this first image on the photographic plate 28, and without shifting the plate or developing the image recorded thereon, the object is stressed. Preferably this is done by utilizing the pump 16 to alter the pressure within the domed cover 14. The pressure may be increased or decreased relative to that of the first exposure. Then the laser 22 is turned on and another exposure is made on the photographic plate 28 of the illuminated object surface 20.

Suppose that the pressure change resulted in no strain on the object surface 20. The photographic media 28 would then have been exposed to two identical sheared images and upon development of the plate 28 a slightly blurred image of the object surface 20 with irregular pattern of equal frequency equal amplitude fringe lines would be observed.

Suppose further that the change in pressure resulted in some uniform change in position of the surface 20 of the object relative to the photographic media; for example, a slight shift toward the medium or a slight shift laterally from the medium. In this event a second blurred image of the object would be recorded on the photographic plate along with an interference pattern resulting from the interference of the first set of interference fringes with the set resulting from this second blurred image. The two interference patterns would interfere with one another producing an overall interference pattern. Because of the uniform movement of the object this pattern would be regular over the entire object surface. When the media was developed a blurred image of the object would be seen and the regular interference pattern would be largely invisible because of its fine size and the fact that the regular amplitude, regularly spaced fringes would result in a uniform darkness level over the entire image.

Suppose however, as is the practical case, that the change in pressure produced an irregular strain over the object surface 20. For example, if a void existed in the object at one point in close proximity to the surface 20 an increase in the ambient pressure might cause a relatively large deflection of that point relative to the balance of the object. In that event the interference pattern produced on the photographic plate as a result of interference of the two patterns produced during the first and second exposures would be irregular; the frequency of the fringes would vary as a function of the displacement of each point on the object's surface between the two exposures.

Figure 3:
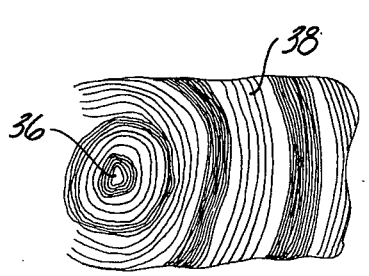
FIG. 3 is an enlarged view of a small section of an interferogram illustrating the constant amplitude, variable frequency fringes obtained on the interferogram with the method of the present invention.

The resulting fringe pattern would have rings of alternating high frequency and low frequency fringes surrounding points of anomalous strain. FIG. 3 is an enlarged view of a small section of such a resulting interferogram. Assume that the point 36 has undergone an anomalous deformation. Rings of fringes 38 would surround this point. However, these fringe patterns would be extremely difficult to view with the naked eye because of the fine nature of the fringes and the fact that the amplitude of the fringes and their duty cycles are equal so that the uniform illumination level is provided.

Figure 5:
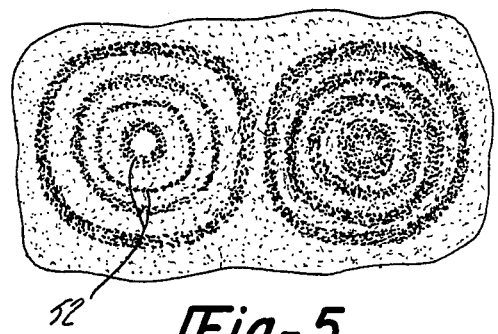
FIG. 5 is an illustration of the resulting object image with superimposed fringe patterns arrayed as a function of the anomalous deformation of the pattern during stressing, obtained after processing with the apparatus of FIG. 4.
Figure 4:
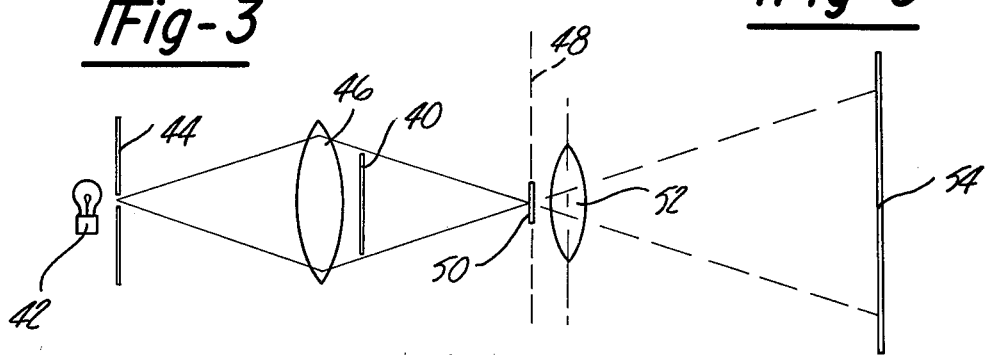
FIG. 4 is a schematic diagram of apparatus for processing an interferogram of the present invention with a Fourier plane filter.

To render these variations in fringe frequency readily visible the developed double exposure interferogram 40 is processed with the apparatus of FIG. 4. The interferogram 40 is preferably developed in the form of a transparency. In alternative embodiments a positive print could be made and filtering could be performed in other manners. In the apparatus of FIG. 4 the transparency 40 is illuminated with a converging beam of light developed from any conventional non-coherent source 42 as through a pinhole filter 44. The beam from the pinhole is collected by an objective lens 46 and passed through a transparency 40. At the Fourier plane 48 a central stop 50 is positioned. This stop acts as a block to the passage of all fringes below a predetermined frequency. The resulting virtual image is projected by a lens 52 onto a screen 54. The screen 54 thus exhibits a blurred image of the object with fringe arrays formed thereon. Since the low frequency fringes have been blocked, blackened areas appear on the image at the position of the low frequency fringes. The resultant image is illustrated in FIG. 5. The blackened areas 52 map the deformation anomalies in the object surface 20.

In alternative embodiments of the invention other forms of fringe-frequency filtering could be employed, for example, an annular, high fringe frequency stop could be employed in the Fourier plane.

To analyze the slopes of vibrational amplitudes of the member, the member 10 could be caused to vibrate with suitable apparatus and only a single exposure made using the optical apparatus. The developed exposure could be processed in the same manner as a double exposure print.

The embodiments of the invention in which an exclusive property or privilege is claimed are defined as follows:

1. The method of analyzing the strain on an object resulting from the application of a stress, comprising: illuminating the object with a coherent light source; exposing a photographic media to a first pair of focused images of the object displaced with respect to one another derived by passing light reflected from the object through a converging lens having a wedge-shaped prism covering a portion of its surface; stressing the object; exposing the photographic media to a second pair of focused images of the object, displaced with respect to one another as the first pair, after stressing, derived from said lens and prism; developing the photographic media; and analyzing the resultant image of the object with a fringe-frequency filter to create an image of the object with fringe families superimposed and arrayed as a function of the strain on the object.

2. The method of claim 1 wherein the step of viewing the image through a fringe-frequency filter involves the generation of a Fourier plane projection of the image, the reimaging of the image from the Fourier plane image, and stopping certain sections of the Fourier plane image.

3. The method of claim 2 wherein the high frequency sections of the image are stopped.

4. The method of claim 1 in which the two images of the object focused on the optical media are displaced relative to one another by a small distance relative to the overall dimension of the images by the action of the prism so that the major portion of the images overlap, whereby interference patterns are formed on the optical media within the overlapped area.

5. The method of claim 1 wherein the source of coherent illumination for the object is a laser.

6. The method of claim 1 wherein the photographic media consists of a planar surface coated with photosensitive chemicals.

7. The method of claim 1 wherein the photographic media is developed to form a transparency and the Fourier plane projection of the object is created by back illuminating the transparency with a converging light beam.

8. The method of forming a photographic image of an object containing interference fringes arrayed as a function of strains resulting from applying a stress to the object, comprising: illuminating the object with coherent light; focusing light reflected from the object onto a photographic media through use of a converging lens having a portion of one of its surface covered by a wedge-shaped prism to form two focused images of the object slightly displaced relative to one another so as to have an area of overlap which comprises a substantial portion of both focused images; applying said stress to the object; focusing the light reflected from the object after the application of stress through said wedge and prism to form two overlapping images of the object, coincident with the first two overlapping images; and developing the photographic media.

9. The method of claim 8 including the further step of processing the resultant image of the object through a fringe-frequency discriminatory Fourier filter to produce an image of the object having a high degree of contrast between fringes of different frequency.

10. The method of claim 9 wherein the step of filtering the object with a Fourier filter comprises illuminating a transparency of the object with a converging light beam derived by passing a point source through a lens and placing a stop in the resulting Fourier plane image.

11. The method of claim 10 wherein the stop is disposed at the center of the Fourier plane image to block low frequency fringes.

12. The method of claim 10 wherein the filtered image is displayed on a screen.

13. Apparatus for generating an image of an object containing interference fringes arrayed as a function of the strain produced in the object by an applied stress, comprising: a laser for generating a beam to illuminate the object; a camera including a converging lens having a substantial portion of its surface covered by a wedge-shaped prism adapted to record a focused image of the object consisting of two images displaced with respect to one another so that a major portion of their areas overlap; and a Fourier plane, fringe frequency discriminatory filter operative to create an image of the object with interference fringes of high contrast.

14. The method of analyzing the relative deformation of points on an object between two conditions, comprising: illuminating the object with a coherent light source; exposing a photographic media through a lens having a portion of one of its surfaces covered by a wedge-shaped prism to two pairs of focused images of the object, each pair consisting of a pair of images displaced with respect to one another and the two pairs being taken in two conditions of the object; developing the photographic media; and analyzing the resultant image of the object with a fringe-frequency filter to create an image of the object with fringe families superimposed and arrayed as a function of the relative displacement of the object between the two conditions.

15. The method of claim 14 wherein the object is undergoing vibration and the two conditions represent the two extreme time average positions of the object during vibration.

16. In apparatus for generating an image of an object containing interference fringes arrayed as a function of the strain produced in the object by an applied stress, of the type operative to form a double exposed image of the object surface with each image consisting of two images displaced with respect to one another, the improvement comprising: means for forming a focused image of the object consisting of two images displaced with respect to one another so that a major portion of their areas overlap comprising a converging lens having a first area of one of its surfaces covered by a wedge-shaped transparent prism with the prism having a thickness at any point proportional to the thickness of the portion of the lens covered by that point.

17. The improvement of claim 16 wherein the prism covers a portion of the surface of the lens opposite to the side of the lens adjacent to the object.

* * * * *